United States Patent
Tzadok et al.

(10) Patent No.: US 8,103,132 B2
(45) Date of Patent: Jan. 24, 2012

(54) FAST KEY-IN FOR MACHINE-PRINTED OCR-BASED SYSTEMS

(75) Inventors: Asaf Tzadok, Nesher (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 12/060,150

(22) Filed: Mar. 31, 2008

(65) Prior Publication Data

US 2009/0245659 A1 Oct. 1, 2009

(51) Int. Cl.
*G06K 9/03* (2006.01)

(52) U.S. Cl. ........ 382/311; 382/182; 382/198; 382/219; 382/309; 382/310

(58) Field of Classification Search .................. 382/100, 382/161, 182, 198, 200, 209, 213, 215, 219, 382/220, 309, 310, 311
See application file for complete search history.

(56) References Cited

U.S. PATENT DOCUMENTS

| | | | |
|---|---|---|---|
| 5,257,328 A * | 10/1993 | Shimizu | 382/311 |
| 5,455,875 A | 10/1995 | Chevion et al. | |
| 5,933,531 A | 8/1999 | Lorie | |
| 6,351,574 B1 | 2/2002 | Yair et al. | |
| 7,466,861 B2 * | 12/2008 | Katoh et al. | 382/225 |
| 7,792,391 B2 * | 9/2010 | Arima | 382/321 |
| 2003/0012460 A1 | 1/2003 | Zlotnick et al. | |
| 2004/0118920 A1 | 6/2004 | He | |
| 2006/0210197 A1 | 9/2006 | Suenaga et al. | |
| 2006/0219773 A1 | 10/2006 | Richardson | |
| 2007/0133874 A1 | 6/2007 | Bressan et al. | |
| 2007/0147659 A1 | 6/2007 | Eremita et al. | |
| 2008/0063278 A1 | 3/2008 | Vincent et al. | |

OTHER PUBLICATIONS

Taghva et al., "The Effects of Noisy Data on Text Retrieval," Journal of the American Society for Information Science; vol. 45, Issue 1, pp. 50-58 (Abstract).

* cited by examiner

*Primary Examiner* — Matthew Bella
*Assistant Examiner* — Eric Rush
(74) *Attorney, Agent, or Firm* — Connolly Bove Lodge & Hutz LLP

(57) ABSTRACT

A method for correcting results of OCR or other scanned symbols. Initially scanning and performing OCR classification on a document. Clustering character/symbol classifications resulting from the OCR based on shapes. Creating super-symbols based on at least a first difference in the shapes of the clustered characters/symbols exceeding a first threshold. A carpet of super-symbols, emphasizing localized differences in similar symbols, is displayed for analysis testing. Depending on results of analysis testing, performing one of: (1) storing the clustered symbols when the carpet of super-symbols passes all of the analysis testing; (2) creating additional super-symbols based on at least a second difference in the shapes of the clustered symbols exceeding a second threshold and returning to analysis testing when the carpet of super-symbols passes most of the analysis testing; and (3) rejecting the clustered symbols when the carpet of super-symbols fails most of the analysis testing and manually keying-in the symbols.

1 Claim, 3 Drawing Sheets

FAST KEY-IN FOR MACHINE-PRINTED OCR-BASED SYSTEMS

FIELD OF THE INVENTION

The invention generally relates to the field of optical character recognition (OCR). More specifically, the invention relates to a technique for efficiently combining automatic OCR functions with human intervention on an as-needed basis.

BACKGROUND OF THE INVENTION

There is a need for a large scale digitization of machine printed documents. Depending on the quality of the scanned data, the OCR level per character ranges from 70% to 99%. This results in the need for an optimized process of key-in system to support the fast verification of the recognized data. As discussed in the following paragraphs, there are several known solutions to this problem.

In the Smart Key method, which uses the concept of carpets, symbols with the same OCR classification are grouped together and shown to the operator on a single screen. In particular, U.S. Pat. No. 5,455,875, to Chevion et al. describes a system and method for quality control and correction of computer-generated OCR data by a human operator. The system can be configured to display to a human operator a full screen of images of individual characters from scanned documents, which were classified by OCR as being the same character. This type of image is referred to as a "carpet." Errors in the OCR classification are manifested as character images that do not fit the displayed classification and stand out clearly against the correct images in the carpet. For example, if the OCR erroneously classifies an "O" as an "L," "S," or "6", the operator will see an image of a incorrectly classified character in a screen full of O's, as shown in FIG. 1. This type of discrepancy is very easy for the human operator to spot and mark on the screen. The image of the field that was read erroneously by the OCR is then displayed so that the operator (or another operator) can type in the correct character.

This method is efficient only if a very high percentage of the characters are classified correctly by OCR (e.g., in the 97-98% range). After the operator rejects the characters that have been classified incorrectly by OCR, the rejected characters are routed to the manual data entry process. This method allows the user to key-in only the characters incorrectly characterized by OCR. That is, in case of 99% recognition level of correct classification by OCR, the operator only has to key-in only 1% of the data. This method utilizes a human's ability to recognize defects in the context of a large body of similar images. With the Smart Key method operators have to validate significant number of characters. Due to the "carpet of symbols," such validation is relatively fast. However, a disadvantage to the Smart Key method is, for large texts (e.g., books and machine printed documents), it is a costly approach.

In side-by-side (SBS) verification method, both document image and its recognition is being shown to the operator for verification. The operator fixes the miss recognized data. However, a disadvantage of this method is that it is slow since the operator's eyes needs to go back and forth from the image to the recognition content.

In the In-Place verification method, the recognized data is overlaid on the image and the user can toggle between the image and the recognized data. Though this method is significantly faster than SBS, a disadvantage of this method is that it is slower than Smart-Key. Therefore, there is a need in the art for a fast method for correcting incorrectly classified OCR symbols that is not costly for large texts, such as machine printed documents.

SUMMARY OF THE INVENTION

One embodiment of the invention is a method for correcting results of OCR or other scanned symbols comprising: scanning a document, performing OCR classification on the scanned document; clustering symbols from the OCR based on shapes of the symbols; creating super-symbols based on first differences in the shapes of the clustered symbols exceeding a first threshold and that provides a display that emphasizes localized differences in similar symbols; displaying a carpet of super-symbols for analysis testing; storing clustered symbols when the carpet of super-symbols passes all of the analysis testing; creating additional super-symbols based on second differences in the shapes of clustered symbols exceeding a second threshold and returning to displaying step when the carpet of super-symbols passes most of the analysis testing; rejecting clustered symbols when the super-symbols fail most of the analysis testing; and storing rejected clustered symbols by manually keying-in the symbols.

In the embodiment discussed above, displaying the carpet of super-symbols further comprises displaying all symbols with identical OCR classification values together on a screen for analysis testing. Further, in the embodiment discussed above, analysis testing further comprises identifying first differences in the shapes of the clustered symbol at a pixel level. Moreover, in the embodiment discussed above, further comprising highlighting the first differences and second differences; and provides a display that emphasizes localized differences in similar symbols with different colors or shades; and wherein a second threshold is less than a first threshold. As an alternative to processing OCR outputs, embodiments of the invention is applicable to differentiating images of other character/symbols (e.g., logos).

BRIEF DESCRIPTION OF THE DRAWINGS

The invention can be described in greater detail with the aid of the following drawings.

DETAILED DESCRIPTION OF THE PREFERRED EMBODIMENT

The Smart-Key method of the background art discussed above was primarily designed for handwritten texts. In contrast, embodiments of the invention modify the Smart-Key method in order to increase its efficiency for long machine printed texts, such as books. In particular, exemplary embodiments of the invention utilize the fact that a typical book is printed using a small number of distinct fonts. Thus, small image distortions (e.g., at the pixel level) in characters/symbols are possible and indeed unavoidable.

However, in the case of machine printed texts, it is quite likely that these variations occur in the same characters/symbols and, thus these variations will be repeated frequently and easy to identify. When using the background art Smart-Key method, all character variations would be validated separately. In contrast to the background art Smart-Key method, embodiments of the invention speed up this process by performing simultaneous correction of a large number of character/symbol variations at once using the super symbols. This is achieved by displaying several similar symbols simultaneously so that the operator is able to validate all the characters at a single glance. Indeed, Smart-Key method works with so called "carpets" displaying up to 100 characters on a single screen. In contrast the super symbol of the approach of embodiments of the invention can yield up to 1000 characters on a single screen.

Figure 1:
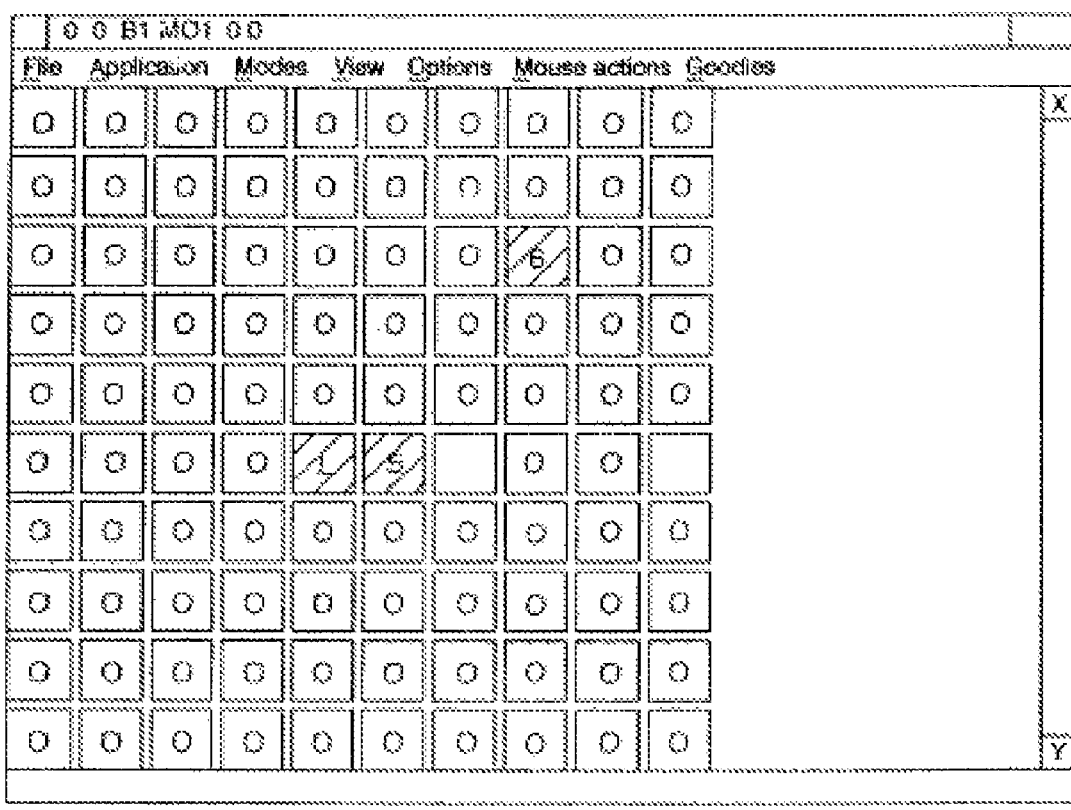
FIG. 1 illustrates the concept of carpets of the background art.
Figure 2:
FIG. 2 is a scanned image of the character "O."
Figure 3:
FIG. 3 is a scanned image of the character "Q."
Figure 4:
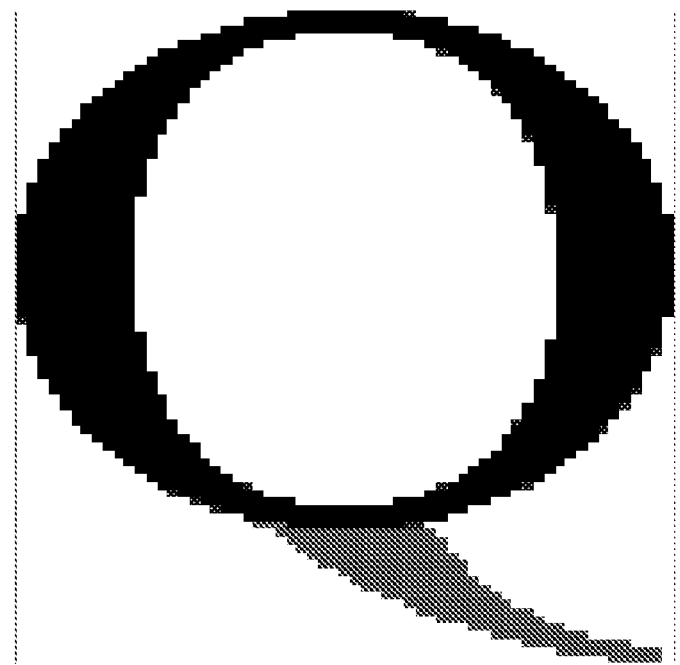
FIG. 4 is a super symbol allowing examination of localized differences for characters that are OCR classified as "O" and "Q."

Moreover, embodiments of the invention emphasize intersymbol differences so that the operator can focus on evaluating localized differences. For example, in evaluating a scanned image for the symbols "O," as shown in FIG. 2; a scanned image of the symbol "Q," as shown in FIG. 3; and a super symbol of the two, as shown in FIG. 4, that allows the operator to identify localized differences between the two when an incorrect OCR classification occurs. That is, with embodiments of the claimed invention, the operator can focus on the pixels on the lower portion of the super symbols where the error occurs and disregard differences on the upper portion where there is typically no error.

When the Smart-Key application encounters two identical representations of the character "a", if OCR classification has low confidence, both characters would go to the manual validation. Clearly, in this case, it is sufficient to perform validation for a single character only. Indeed validation decisions would be the same for all the symbols that look exactly the same.

In addition, the method of embodiments of the invention can be extended to similar (albeit non-identical) character/symbol image occurrences. As a non-limiting example, say we have multiple character/symbol occurrences with a difference that may be of only a single pixel (e.g., "e", "o" and "c"). The method of embodiments of the invention groups the multiple scanned images together, while highlighting the problematic pixels with, for example, different colors or shades. We can proceed in such a manner creating a super symbol representing a cluster of similar images. A localized examination of the differences might focus on the middle for "e" over "o" and "c"; and on the right side for "o" over "e" and "c"; and some combination of localized areas to differentiate the three. With this ability to focus on a localized area for differences, the operator would be able to accept/validate the entire cluster at a single glance, speed the recognition process and improve the recognition performance of OCR systems.

In addition, if the operator notices that problematic (i.e., non-identical) characters/symbols resulted from different characters with similar characteristics (e.g., "e," "o" and "c"), the super symbol would be flagged and routed for more detailed handling. For example, the operator may point his/her mouse at the problematic area to flag the issue and the system would split the given super symbol into the corresponding sub clusters. In order to further facilitate validation, a color display and color highlights can be used.

For example, with pixels that are black, all the symbols in the cluster would be shown in black. Color could be used for extensions, variations or problematic areas of what appears only for a sub group of a cluster and would be shown, for example but not limited to the color red, blue, green, yellow, etc. This method can compress thousands of occurrences of variations into only one super symbol. This method results in significant acceleration of the manual key-in process.

After further review of the carpet of super symbols, the operator can choose one of the following three options:
1. push on accept button: this action accepts all the characters that are included in the super symbol;
2. push reject button: in this case super symbol is transformed back to the individual characters so that each character can be entered/keyed-in manually; and
3. push "recompute" button: in this case the system would attempt to break given super symbols into a number of smaller super-symbols for further analysis testing.

This can be done by the same technique used for the construction of the original super symbols, as discussed above. However, in this case at least a second threshold would be decreased in number (i.e., tightened in range), as compared to the first threshold, and used to compute the additional super symbols. As a non-limiting example, if the original super symbol one can allow characters having 2 different pixels. In the subsequent round, a second threshold would allow only a single-pixel difference in an attempt to further differentiate localize areas that are problematic.

Figure 5:
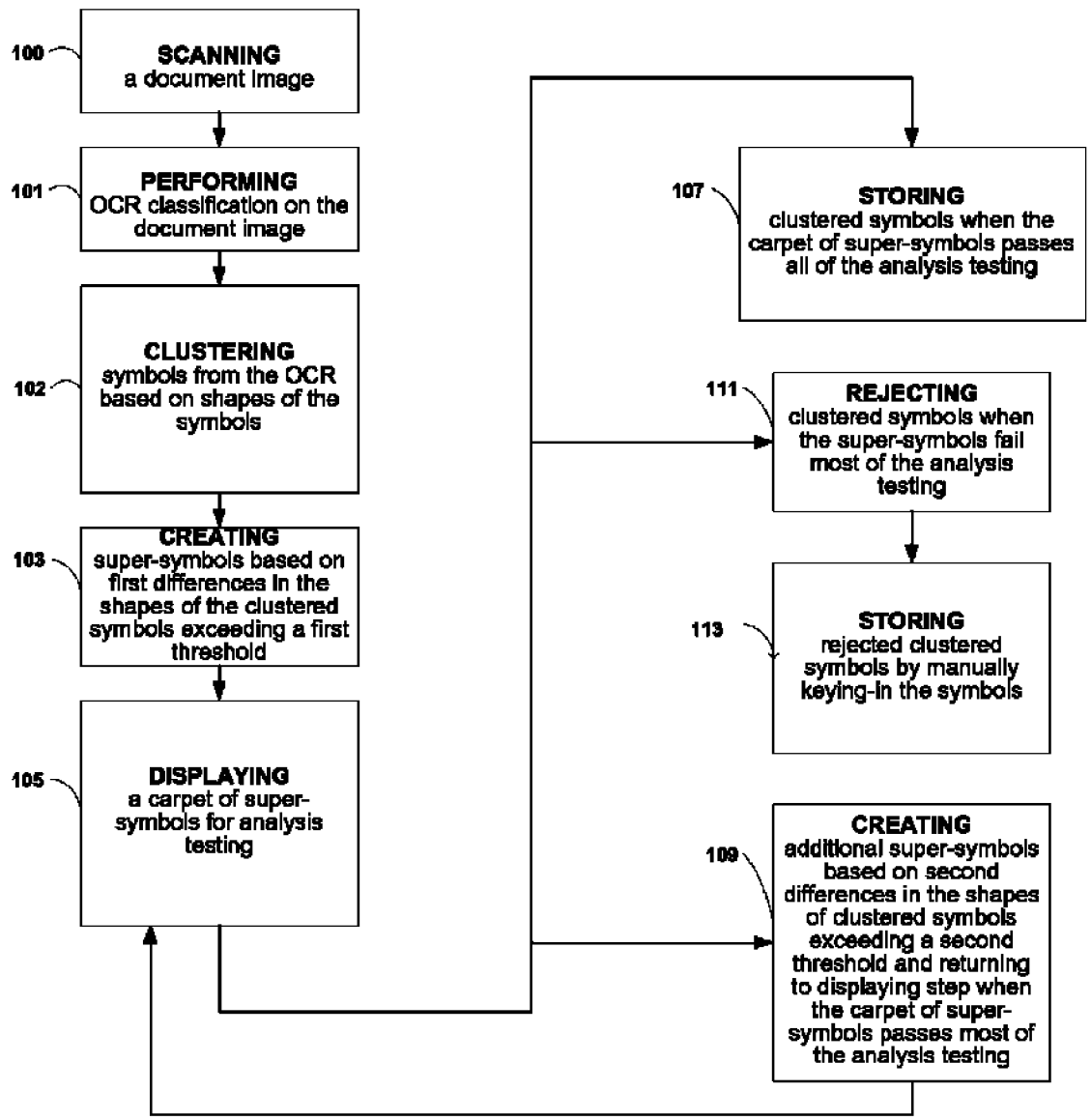
FIG. 5 is an exemplary flow diagram of an embodiment of the invention.

FIG. 5 is an exemplary embodiment of the invention for implementing the above-discussed method for correcting results of optical character recognition (OCR). In particular, step 100 involves scanning a document image into a system. Step 101 is performing OCR classification on the scanned image. Clustering symbols from the OCR classification based on shapes of the symbols in step 102 where all characters/symbols having the same OCR classification and similar shape would be grouped into a single cluster (e.g., "O" and "Q" as shown in FIG. 2 to FIG. 4). In step 103, super symbols are created based on first differences in the shapes of the clustered symbols exceeding a first threshold. A carpet of super symbols is displayed for analysis testing in step 105. Step 107 involves storing clustered symbols when the carpet of super-symbols passes all of the analysis testing (i.e., all symbols in the carpet are the same). Sub groups of additional super symbols are created based on second differences in the shapes of clustered symbols exceeding a second threshold and returning to displaying step 105 when the carpet of super symbols passes most of the analysis testing occurs in step 109. Step 111 involves rejecting clustered symbols when the super-symbols fail most of the analysis testing. Storing rejected clustered symbols by manually keying-in the symbols occurs in step 113.

The foregoing description illustrates and describes embodiments of the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

In addition, embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include, but are not limited to, compact disk read only memory (CDROM), compact disk-read/write (CD-RIW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for correcting results of optical character recognition (OCR) comprising:
   scanning a document image;
   performing OCR classification on the document image;
   clustering symbols from the OCR classification based on shapes of the symbols;
   creating super symbols based on first differences in the shapes of the clustered symbols exceeding a first threshold and that provides a display that emphasizes localized differences in similar symbols;
   displaying a carpet of super symbols for analysis testing; and performing one of:
   storing the clustered symbols when the carpet of super symbols passes all of the analysis testing;
   creating additional sub groups of super symbols based on second differences in the shapes of the clustered symbols exceeding a second threshold and returning to the displaying step when the carpet of super symbols passes most of the analysis testing; and
   rejecting the clustered symbols and storing the rejected clustered symbols by manually keying-in the symbols when the carpet of super symbols fails most of the analysis testing.

* * * * *